(12) United States Patent
Vicars

(10) Patent No.: US 6,786,111 B2
(45) Date of Patent: Sep. 7, 2004

(54) CONNECTING ROD

(75) Inventor: Berton L. Vicars, Odessa, TX (US)

(73) Assignee: Gardner Denver, Inc., Quincy, IL (US)

( * ) Notice: Subject to any disclaimer, the term of this patent is extended or adjusted under 35 U.S.C. 154(b) by 77 days.

(21) Appl. No.: 10/121,614

(22) Filed: Apr. 15, 2002

(65) Prior Publication Data

US 2003/0192398 A1 Oct. 16, 2003

(51) Int. Cl.⁷ .............................. G05G 1/00; F16C 1/00; F16C 7/00; F16C 11/00
(52) U.S. Cl. ...................... 74/579 R; 74/579 E; 74/569; 403/162
(58) Field of Search .......................... 74/579 R, 579 E, 74/587, 569, 42; 213/1.3; 166/113, 84.2; 188/378; 403/162

(56) References Cited

U.S. PATENT DOCUMENTS

| | | | |
|---|---|---|---|
| 105,122 A | 7/1870 | Parmele | |
| 1,384,200 A | 7/1921 | Lochrane | |
| 1,434,143 A | * 10/1922 | Patterson et al. | 403/162 |
| 3,893,788 A | 7/1975 | Ditlinger | |
| 4,105,098 A | * 8/1978 | Klimaitis | 188/378 |
| 4,164,257 A | * 8/1979 | Anthony et al. | 166/113 |
| 4,458,555 A | 7/1984 | Holtzberger et al. | |
| 4,554,840 A | * 11/1985 | Marchesi | 74/42 |
| 4,561,164 A | 12/1985 | Wossner et al. | |
| 4,841,801 A | * 6/1989 | Tice | 74/579 R |
| 4,930,405 A | 6/1990 | Lilie | |
| 5,549,156 A | * 8/1996 | Borden | 166/84.2 |
| 5,676,024 A | * 10/1997 | Yoshida et al. | 74/569 |
| 5,758,550 A | 6/1998 | Lenczyk | |
| 6,282,983 B1 | * 9/2001 | Evans | 74/579 E |
| 6,290,079 B1 | * 9/2001 | Altherr | 213/1.3 |
| 2003/0075007 A1 | * 4/2003 | Seo | 74/587 |

FOREIGN PATENT DOCUMENTS

JP        52-21550    *  2/1977    ............... 74/579 E

* cited by examiner

Primary Examiner—Vinh T. Luong
(74) Attorney, Agent, or Firm—James B. Conte

(57) ABSTRACT

A connecting rod including shaft with a major flange projecting outwardly from one of its ends and a minor flange projecting outwardly from the other of its ends. The major flange and the minor flange each have a number of holes for the passage of threaded fasteners. Abutting the minor flange is a ring with a transverse aperture. A number of threaded fasteners releasably join the shaft and the link together.

4 Claims, 1 Drawing Sheet

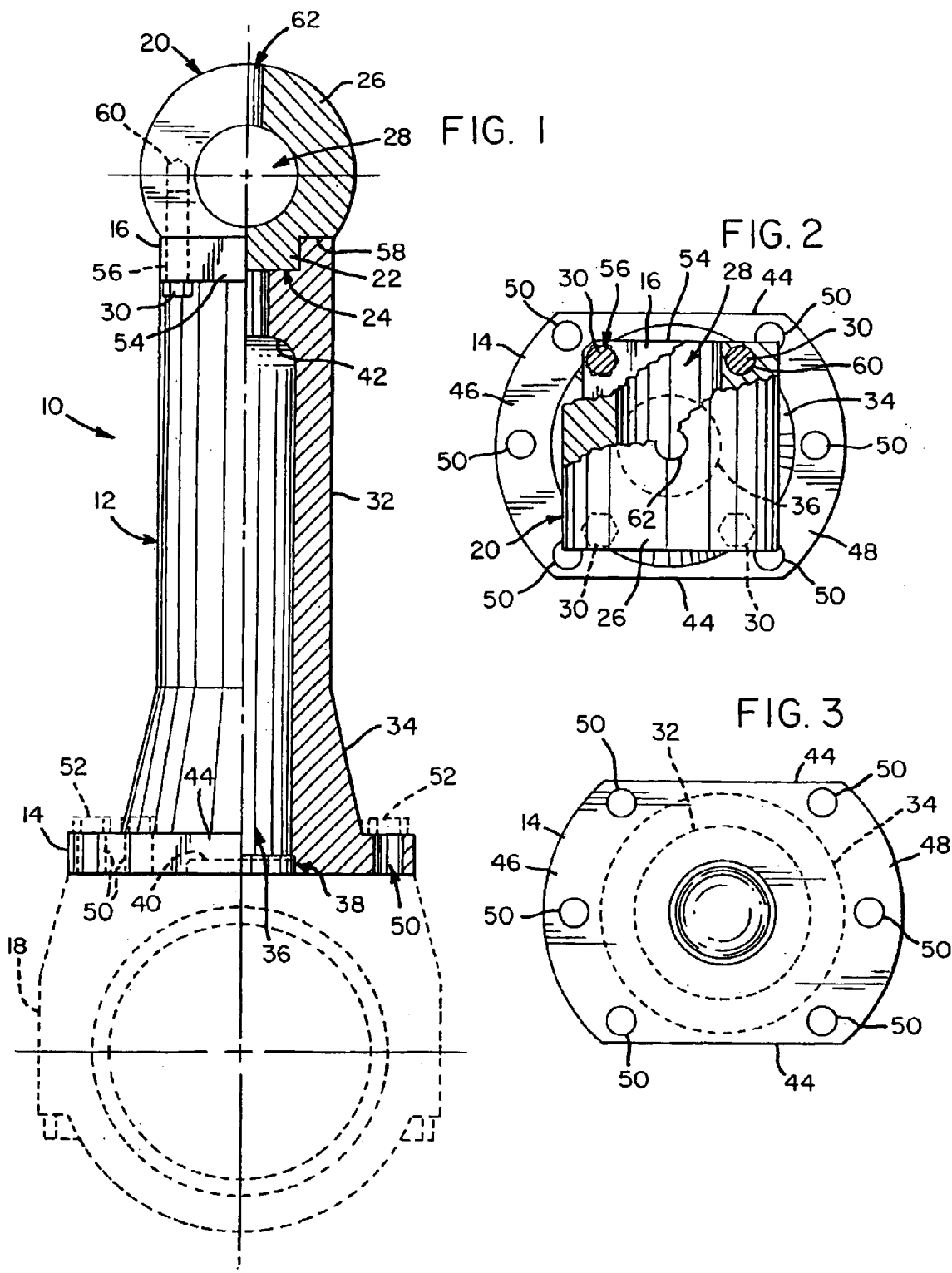

CONNECTING ROD

FIELD OF THE INVENTION

The present invention relates generally to machine elements and, more particularly, to pitmans and connecting rods.

BACKGROUND OF THE INVENTION

It is difficult to produce oil and gas in an economic manner from low permeability reservoir rocks. Production rates are often boosted by resorting to hydraulic fracturing, a technique that increases rock permeability by opening channels through which reservoir fluids can flow to recovery wells. During hydraulic fracturing, a fluid is pumped into the earth under high pressure where it enters a reservoir rock and fractures it. Proppants are carried in suspension by the fluid into the fractures. When the pressure is released, the fractures partially close on the proppants leaving channels for oil and gas to flow.

Specialized pumps are used to develop the pressures necessary to complete a hydraulic fracturing procedure or "frac job." These pumps are usually provided with connecting rods that join a crosshead to a plunger that pressurizes a fluid. A conventional connecting rod is cast as a single unit and machined to desired tolerances. When portions of such a connecting rod wear out, the rod must be replaced in its entirety—a time-consuming, wasteful and costly undertaking. Multi-piece connecting rods have been developed as a substitute for one-piece rods with the purpose of permitting just the worn portions of a rod to be removed. Unfortunately, multi-piece rods have not gained widespread acceptance since wear has tended to occur not only in the usual locations, but, also, at the junctions between the joined pieces. Thus, the known multi-piece connecting rods, like the one-piece rods they were meant to supplant, often require a full replacement when partially worn.

SUMMARY OF THE INVENTION

In light of the problems associated with the known connecting rods, it is a principal object of the invention to provide a new connecting rod with two portions that can be easily disconnected from one another for replacement when worn. Once disconnected from one another, a worn portion can be removed and replaced while the other portion remains in place in a pump, thus saving time and money. Disconnection can be accomplished with ordinary tools and with minimal training.

It is another object of the present invention to provide a connecting rod of the type described that has a solid, self-aligning connection between its two principal portions. Such a connection impedes wear where the two portions contact one another and ensures that set-up will be proper prior to use.

It is another object of the invention to provide a connecting rod of the type described whose principal portions are integrally formed. Lacking welds and other mechanical connectors, each rod portion is designed for maximum strength.

It is an object of the invention to provide improved elements and arrangements thereof in a connecting rod for the purposes described which is lightweight in construction, inexpensive to manufacture, and dependable in use. Although the connecting rod is described as being of particular utility in oilfield pumps, it is anticipated that it will provide like benefits in other reciprocating engines and machines.

Briefly, the connecting rod in accordance with this invention achieves the intended objects by featuring a tubular shaft with a cylindrical section and a gusset section whose wall thickness varies with length. A major flange projects from the outer end of the gusset section whereas a minor flange projects from the outer end of the cylindrical section. The major and minor flanges have holes for the passage of threaded fasteners. A link has an alignment plug for insertion into a socket in the outer end of the cylindrical section of the shaft. A ring is secured to the alignment plug. A number of threaded fasteners releasably join the shaft and the link.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a side elevational view of a connecting rod in accordance with the present invention with portions broken away to reveal details thereof.

FIG. 2 is a top view of the connecting rod of FIG. 1 with portions broken away.

FIG. 3 is a bottom view of the connecting rod.

Similar reference characters denote corresponding features consistently throughout the accompanying drawings.

DETAILED DESCRIPTION OF THE PREFERRED EMBODIMENT

Referring now to the FIGS., a connecting rod in accordance with the present invention is shown at 10. Connecting rod 10 includes a shaft 12 having major and minor flanges 14 and 16 at its opposed ends. Major flange 14 is configured for attachment to a bearing housing 18 and minor flange 20 is configured for attachment to a crosshead link 20. Link 20 has an alignment plug 22 for insertion into a socket 24 in the center of minor flange 16. A ring 26 is integrally formed with plug 22 and has a transverse aperture 28 for receiving a crosshead pin (not shown). A number of bolts 30 penetrating minor flange 16 and ring 26 releasably fasten shaft 12 and link 20 together.

Shaft 12 comprises an elongated, hollow tube whose outer and inner diameters vary along its length. As shown, shaft has a cylindrical section 32 with a constant outer diameter from which a gusset section 34 with a gradually increasing outer diameter extends to reinforce major flange 14. A passageway 36 extends through shaft 12 and is enlarged in terms of diameter at both of its ends so as to form sockets 24 and 38 for receiving alignment plugs 22 and 40 of link 20 and bearing housing 18. A peripheral wall 42 extends inwardly from cylindrical section 32 into passageway 36 and serves as an abutment for plug 22 and a reinforcement for shaft 12 adjacent flange 16.

Major flange 14 is an outwardly projecting rim for strengthening the connection between shaft 12 and bearing housing 18. For compactness, major flange 14 is provided with clipped, linear sides 44 that limit its outward projection from shaft 12 to front and back projections 46 and 48. Projections 46 and 48 are each provided with a plurality of holes 50 arrayed around gusset section 34. The centers of four holes 50 are arrayed to define a square. Through holes 50, bolts 52 are extended for threaded attachment to bearing housing 18.

Minor flange 16 is an outwardly projecting rim for strengthening the connection between shaft 12 and link 20. Preferably, minor flange 16 is provided with an outline resembling a square whose sides 54 are parallel to sides 44 of major flange 14. Each of the four corners of flange 16 is provided with a hole 56 through which a bolt 30 is extended for threaded attachment to link 20. The centers of holes 56 define a square whose sides are parallel to that extending through the centers of four holes 50.

Alignment plug 22 is a solid cylinder that fits snugly and fully into socket 24 so as to assure proper centering of link 20 on shaft 12. Plug 22 projects from a flat surface 58 in the base of ring 26. Preferably, four, threaded bores 60 penetrate surface 58 adjacent plug 22 and are positioned for alignment with holes 56 for the passage of bolts 30. When bolts 30 are firmly tightened in bores 60, the longitudinal axis of transverse aperture 28 is oriented at right angles to sides 44 and 54 of flanges 14 and 16. To supply a flow of lubricant to aperture 28 and a crosshead pin within it, an opening 62 is provided in ring 26 opposite surface 58.

From the foregoing, it will be appreciated that the use of connecting rod 10 is straightforward. Installation of connecting rod 10 in a pump is accomplished in a conventional a manner with shaft 12 and link 20 being joined by bolts 30. After the pump has been run for substantial period, link 20 may show signs of wear about aperture 28 that serves as a bearing surface. (Shaft 12 is unlikely to show any wear since movement of bearing housing 18 and link 20 relative to flanges 14 and 16 during use is nil.) By untightening bolts 30 and manipulating the driving mechanism of the pump, a worn link 20 can be removed from shaft 12 and replaced by an unworn link 20. Reinstalling bolts 30 in the new link 20, permits the pump to be energized and operated. Since rod servicing does not require the removal of bearing housing 18 from the pump, it can be completed in substantially less time than is required with conventional connecting rods. Also, since only the worn link 20 is replaced, the waste of material that accompanies the removal of the shaft and bearing housing of a conventional connecting rod from a pump is eliminated.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A connecting rod, comprising:
    a (12) shaft having:
        opposed ends;
        a major flange (14) projecting outwardly from one of said opposed ends;
        a minor flange (16) projecting outwardly from the other of said opposed ends; and
        said major flange (14) and said minor flange (16) each having a plurality of holes (50, 56)
    a link (20) having:
        a ring (26) with a transverse aperture, abutting said minor flange and said link includes an alignment plug (22) for insertion into said shaft; and,
        a plurality of threaded fasteners (30) releasably fastening said shaft and said link together.

2. A connecting rod, comprising:
    a tubular shaft (12) having:
        opposed ends with sockets (24, 38) in said opposed ends;
        a major flange (14) projecting outwardly from one of said opposed ends;
        a minor flange (16) projecting outwardly from the other of said opposed ends; and,
        said major flange (14) and said minor flange (16) each having a plurality of holes (50, 56); and
    a link (20) having:
        an alignment plug (22) for insertion into said socket (24) adjacent said minor flange;
        a ring (26) secured to said alignment plug with a transverse aperture; and,
        a plurality of threaded fasteners (30) releasably fastening said shaft and said link together.

3. A connecting rod, comprising:
    a tubular shaft (12) having:
        a cylindrical section (32) with a constant outer diameter and a gusset section (34) with a evenly increasing outer diameter extending therefrom;
        a pair of opposed ends with one being in said cylindrical section and the other being in said gusset section;
        a pair of sockets, (24, 38) one being located in each of said opposed ends;
        a major flange (14) projecting outwardly from said opposed end in said gusset section (34);
        a minor flange (16) projecting outwardly from said opposed end in said cylindrical section (32); and,
        said major flange and said minor flange each having a plurality of holes (52, 56);
    a link (20) having:
        an alignment plug (22) for insertion into said socket (24) adjacent said minor flange;
        a ring (26) secured to said alignment plug with a transverse aperture; and,
    a plurality of threaded fasteners (30) releasably fastening said shaft and said link together.

4. The connecting rod according to claim 3 further comprising a passageway (36) extending through said tubular shaft and a peripheral wall (42) extends inwardly from said cylindrical section into said passageway reducing the diameter thereof and serving as an abutment for said alignment plug.

* * * * *